United States Patent [19]
Rasmussen et al.

[11] Patent Number: 6,074,755
[45] Date of Patent: Jun. 13, 2000

[54] METHOD FOR PREPARING A LAMINATE

[75] Inventors: Max Otto Henri Rasmussen; Janne Rasmussen; Peter Max Rasmussen, all of Karlslunde, Denmark

[73] Assignee: Curex APS, Nyboring Mors, Denmark

[21] Appl. No.: 08/983,463

[22] PCT Filed: Jul. 11, 1996

[86] PCT No.: PCT/DK96/00319

§ 371 Date: Jan. 13, 1998

§ 102(e) Date: Jan. 13, 1998

[87] PCT Pub. No.: WO97/03821

PCT Pub. Date: Feb. 6, 1997

[30] Foreign Application Priority Data

Jul. 19, 1995 [DK] Denmark ................... 0846/95

[51] Int. Cl.$^7$ ................... B32B 7/04
[52] U.S. Cl. ............ 428/420; 156/310; 156/331.7; 264/176.1; 264/210.1; 426/106; 426/127
[58] Field of Search .................. 426/106, 126, 426/127; 156/310, 314, 331.7; 264/176.1, 210.1

[56] References Cited

U.S. PATENT DOCUMENTS

| | | | |
|---|---|---|---|
| 3,598,671 | 8/1971 | Wortman | 156/310 X |
| 3,616,040 | 10/1971 | Toback | 156/310 |
| 3,887,757 | 6/1975 | Stone et al. | 156/331.7 X |
| 4,092,202 | 5/1978 | Bergk et al. | 156/331 |
| 4,623,709 | 11/1986 | Bauriedel | 528/65 |
| 5,143,995 | 9/1992 | Meckel et al. | 528/59 |

FOREIGN PATENT DOCUMENTS

| | | |
|---|---|---|
| 661599 | 7/1993 | Australia . |
| 0 097 206 | 1/1984 | European Pat. Off. . |
| 0 171 919 | 2/1985 | European Pat. Off. . |
| 0 152 102 | 8/1985 | European Pat. Off. . |
| 0586843 | 3/1994 | European Pat. Off. . |

*Primary Examiner*—Milton Cano
*Attorney, Agent, or Firm*—Sughrue, Mion, Zinn, Macpeak & Seas, PLLC

[57] ABSTRACT

A laminate is prepared that can be further treated comparatively soon after its preparation, the process comprising that a first solid film is applied with a fluid adhesive layer that cures influenced by a catalyst, whereupon a secondary solid or fluid film consisting totally or partially of plastic material, is brought into contact herewith, whereby the secondary film contains a catalyst for the curing of the adhesive. The laminate prepared is suitable as packaging material, e.g. for food.

33 Claims, No Drawings

METHOD FOR PREPARING A LAMINATE

The present invention relates to a process for the preparation of a laminate. Furthermore, the invention relates to a laminate obtainable by the process mentioned, as well as the use of said laminate for the packaging of food. Finally, the invention relates to a packaging material comprising the said laminate.

Plastic film is a frequently used material for the packaging of numerous articles and products. Within many fields of application, the requirements for such plastic films are of a character that cannot be met by one film alone. Consequently, various laminates of films have been developed with properties that in many respects meet the requirements better.

Usually, adhesives are used to attach separate films to each other, thus generating a laminate. Various requirements are made for such adhesives, e.g. adherence, heat resistance, transparency etc., and it has been proved that, inter alia, polyurethane-containing adhesives may be used for the adhesion of the separate films of a laminate, thus obtaining the requested properties of the laminate.

As far as polyurethane adhesives are concerned, it is problematic, however, that the curing time is long and that a laminate has to age, possibly at a comparatively high temperature and in a properly ventilated room, to ensure the adhesive curing.

In order to reduce the curing time of the adhesives, various procedures have been instituted, including the addition of a catalyst for the curing reaction.

When using a catalyst, the simplest way to accelerate the curing of a polyurethane adhesive is to add the catalyst directly into the polyurethane adhesive, immediately before the adhesive is applied to a film that is to be attached onto a secondary film. On an industrial scale, this is not efficient, however, since to some extent the adhesive composition will have cured before use. The curing will result in a viscosity enhancement and a subsequently more difficult application onto the film, where the application quantity is uncontrollable. The time period, within which the adhesive composition may be administered, the so-called pot-time, is thus restricted, and in case of production break-downs may cause glue vessels and application devices having to be cleared of cured adhesives.

To overcome the said problem of the low pot-time, in EP-A1-0152102 it is suggested to use a urethane adhesive containing micro capsules with a catalyst for the curing. Such micro capsules will be destroyed when the laminate film is attached by means of pressure rollers, which releases the encapsulated catalyst.

When using this process, the disadvantage is that a homogenous distribution of the catalyst in the glue layer cannot be obtained, as the catalyst concentration will peak in the immediate vicinity of the destroyed capsule. Furthermore, such capsules will remain in the adhesive as a suspension and thus precipitate when stored.

Another suggestion to bring a polyurethane adhesive in contact with the catalyst is described in EP-AL-0586843. In this, a process for preparing a laminate film is disclosed, wherein at least two films are attached by a polyurethane adhesive, the adhesive layer or the adhesive free film being humidified with an aqueous solution bearing at least one catalyst, which accelerates the curing reaction of polyurethane adhesives. The catalyst solution humidification is problematic, however, since it will be difficult to obtain a homogenous distribution of the solution on a film, of e.g. polyethylene or polypropylene, even when using a surfactant in the solution. Inter alia the reason is, that a suitable equipment for a homogenous application of the catalyst solution all over the film is not available, which means, that in certain sections of the prepared laminate water will accumulate, which results in a decomposition of isocyanate to the corresponding amine compound, thus involving the risk of a subsequent amine compound migration. Therefore, whenever preparing a laminate as disclosed in EP-A1-058-6843, it will be necessary to age the laminate before use, especially when foreseen for the packaging of food.

The purpose of the present invention is to bring about a process for preparing a laminate that may be exposed to further treatment comparatively soon after the preparation, without a long ageing period.

This purpose is obtained when using the process according to the invention, wherein a fluid adhesive layer, wherein the curing is accelerated by a catalyst, being applied to a first solid film, whereupon a secondary solid or fluid film, consisting totally or partially of plastic material, is contacted herewith, the latter film containing a catalyst for the acceleration of the adhesive curing.

Furthermore, the invention relates to a laminate obtainable when using the said process. The invention also relates to the use of this laminate for the packaging of food. Finally, the invention relates to a packaging material comprising the laminate.

In addition, the present invention has shown that, at an early stage after the preparation of the laminate, the amine migration is rather low, and, at the same time, a fairly satisfactory mutual adherence of the films is obtained shortly after the preparation of the laminate. Due to the fast curing of the adhesive used as well as the low amine migration, the laminate prepared needs no ageing before further treatment. Especially to the food industry it is extremely important that the amine migration is low and ought not be present when the laminate is used. The fact that the laminate prepared may be exposed to further treatment shortly after its preparation will be appreciated by the producer, along with the reduced need for storage room, and, in relation to time of production, advanced sales of the laminate prepared.

Moreover, unexpectedly, after a complete curing of the adhesive, the laminate according to the invention has proved to have an adhesion property between films that is higher or equal to that of laminates prepared without the use of a catalyst. Finally, it was shown that the laminate according to the invention has a higher friction number than laminates without a catalyst, which is very interesting as far as certain types of packaging are concerned.

The film comprising a catalyst to accelerate the adhesive curing may, when contacted with the adhesive layer, be a solid film or a fluid film. In case of a solid film the process is described as a glue lamination, and in case of a fluid film it is described as an extrusion lamination. When getting into contact with the adhesive layer, the fluid film has an increased temperature, but when cooling after the application it solidifies to become a solid film.

The catalyst is usually added to the plastic material when this is in its fluid stage, i.e. by means of dissolution, dispersion or emulsification.

As adhesive any adhesive, curing in the presence of a catalyst, may be chosen. Preferred adhesives are of the polyurethane type and alcohol or water based imine-epoxy systems. Polyurethane adhesives may be single-component systems or double-component systems. A polyurethane adhesive contains at least one organic polyisocyanate and at least one polyol, wherein the polyisocyanate contains two or more isocyanate groups and the polyol two or more hydroxy groups. The polyol may be a polyester polyol, a polyether polyol or a polyether esterpolyol. The polyisocyanate may be a pre-polymer.

Typical examples of diisocyanates for polyurethane adhesives are 1,6-diisocyanate-hexane, 1,10-diisocyanatedecane, 1,3-diisocyanatecylopentane, 1,4-diisocyanatecyclohexane, 1-isocyanate-3,3,5-trimethyl-3 or -5-isocyanatemethancyclohexane, 4,4'-, 2,4'- and 2,2'-diisocyanate diphenylmethane, 1,5-di-isocyanatenaphtaline, 4,4'-di-isocyanate-dicyclohexylmethane, 1,4-diisocyanate-benzene and/or 2,4- or 2,6-diisocyanatetoluene. Prepolymers of polyisocyanates may e.g. be achieved by reacting the above diisocyanates by a polyvalent alcohol.

Typical examples of polyols for polyurethane adhesives are alkandiols with linear or branched carbon chains, like ethylenglycol, 1,2-dihydroxypropane, 1,3-dihydroxypropane, 1,4-dihydroxybutane, 1,6-dihydroxyhexane and neopentylglycol. In case of the polyol being a polyetherpolyol this is usually obtained by adding ethylenoxid to a compound comprising two or more active hydrogen atoms in a molar ratio of 30 to 90%. Suitable examples of compounds comprising two or more active hydrogen atoms are ethylenglycol, di-ethylenglycol, propylenglycol, dipropylenglycol, glycerin, trimethylolpropane, pentaerytritol, sorbitol, saccharose or the like. Instead of ethylenoxid e.g. propylenoxid and butylenoxid may be used. Preferentially, polyetherpolyoln has a molecular mass in the range from 1,000 to 20,000, especially between 1,000 and 5,000.

Polyurethane adhesives used for single-component systems contain e.g. pre-polymers of polyisocyanates and polyols, the adhesive being cured when reacted with water. Examples of this may be found in German letters patent No. 2549227 corresponding to U.S. Pat. No. 4,092,202 and European patent application No. 0586843 A1. European patent application No. 0586843 A1 discloses as a single-component system a prepolymer of 4,4'-diphenylmethane diisocyanate and polypropylene glycolether.

Double component systems either consist of pre-polymers with free isocyanate groups curing by means of a hydroxy group bearing crossbinder, or of pre-polymers with free hydroxy groups, curing by means of a isocyanate group bearing crossbinder. Examples of the first type of double-component systems are stated in German laid-open publication No. 4021113 corresponding to U.S. Pat. No. 5,143,995 and in European patent No. 150444 corresponding to U.S. Pat. No. 4,623,709. Examples of the latter type of double-component systems are listed in European letters patent No. 176726. The double-component system disclosed in European letters patent No. 176726 comprises a conventional polyisocyanate with an average NCO functionality of at least 2.0 and an oligourethane prepolymer with a molecular weight of 1500 to 8000, oligourethane being essentially a modified, ether group-free, urethane containing polyesterpolyol, optionally containing chain elongation agents, having a hydroxy group content of 0.4 to 2.2% by weight and a urethane group content of 1.4 to 7% by weight. No matter the type of polyurethane adhesive, these may contain a solvent, be free of solvents or water based. For the process according to the present invention, it is preferred to use a double-component system, in which the various components are mixed immediately before their application onto the first film.

The catalyst accelerating the curing of the polyurethane adhesives are known as such. Various substance groups have proved active as catalysts, inter alia Lewis bases and Lewis acids. The most important Lewis bases are tertiary amines, e.g. diazabicycolloctane, triethylamine, dimethylbenzylamine, bisdimenthylaminoethylether, tetramethylguanidine and bisdimethylaminomethylphenol. The most important catalytically effective Lewis acids are metallo-organic compounds, especially tin organic compounds, like tindiethylhexanoate, dibutyltindilaurate, dibutyltinbisdodecylmercaptide and lead-phenylethyldithiocarbaminate. The metallo-organic compounds are assumed to activate the isocyanate groups thus making these electrofile, whereas the bases first and foremost increase the nucleophile properties in the OH group.

Other known catalysts are alkaline salts of organic acids and phenols, like phenol-Mannich-bases, phosphine and phospholinoxide.

It turned out that also $\epsilon$-caprolactame and polyethylenglycol have catalytic properties, and in the present invention it is preferred to use $\epsilon$-caprolactame as a catalyst. $\epsilon$-caprolactame melts at 69.2° C., and preferentially, the secondary film comprising the catalyst is obtained by mixing the melted $\epsilon$-caprolactame into the melted plastic material prior to moulding this mixture into a film.

Preferably, the catalyst content of the plastic material is to up to 5,000 ppm, especially 50 to 250 ppm.

If the catalyst cannot be dissolved in the melted plastic material, the catalyst may be dissolved in advance in a smaller amount of solvent and then, possibly using an emulator, mixed into the plastic material.

As plastic material any material may be used that is suitable for the final use of the laminate. The plastic material may be i.e. polyolfines, like polyethylene and polypropylene, polyamides, polyesters, polyethers or polyvinylchloride. Especially preferred is polyethylene or polypropylene as the plastic material comprising the catalyst. If desired, this film may be reinforced by means of a suitable material with a high tensile strength in order to enhance the mechanical strength of the film. A reinforcement material of this kind may be oriented or not oriented.

The film to be applied with the fluid adhesive layer may be totally or partially made of paper; metal, preferably aluminium-containing metal; or plastic material, preferably chosen between polyesters, polyethers, poly-amides, poly-olfines (like polyethylene and polypropylene). The plastic material may be vacuum evaporated and/or comprise a catalyst.

If desired, the used first and secondary film may individually be a laminate film consisting of two or more film layers. Inter alia, such laminate films include laminate films produced by means of co-extrusion, glue lamination and extrusion lamination. Thus the present invention also comprises laminates including more than two layers of films, e.g. 3–8 film layers.

In case of glue lamination, a preferred embodiment involves that the first solid film being rolled up is conveyed through an adhesive application device, which distributes a homogenous and uniform layer of adhesive onto the first film. In a pressure roller system, the first film with the applied adhesive layer is subsequently brought into contact with the secondary solid film containing plastic material that comprises a catalyst for the curing of the adhesive. The laminate thus prepared is being conveyed on, and as a rule rolled up for later further treatment.

In case of extrusion lamination it is preferred to apply the secondary film in a fluid form onto the first film, onto which an adhesive layer has been applicated beforehand. The secondary film, applicated in the fluid form, subsequently solidifies, possibly when the laminate length is passing a cooling zone. If desired, the laminate may be used as such for further treatment, or the laminate may be conveyed through a pressure and cooling roller system.

Without any intention of limiting the invention to a specific theoretical explanation, it is assumed, that by means of diffusion the catalyst in the secondary film penetrates into the adhesive layer thus accelerating the curing of the adhesive.

If desired, the first film may comprise a catalyst as well, so that the adhesive layer receives catalysts from two sides, which presumably enhances the acceleration of the curing. A process of this kind will is very dependable on the reliability of the operation, since, in case of production failure, the first film with its adhesive layer, cannot be adhered to the secondary film later on. Therefore, usually, it is preferred to use catalysts in the secondary film only.

If the laminate is used for food packaging, so that it gets into intimate contact with food, the laminate may be arranged so only the first film with no catalyst content gets into intimate contact with food. Alternatively, a catalyst may be chosen, which does not expose food to catalysts in a toxic quantity. As a matter of fact, in Denmark the health authorities allow the use of a ε-caprolactame in plastic material for food in an amount of 5,000 ppm or less. Similarly, the health authorities recommend an amine migration of no more than 1.1 μg/dm$^2$.

In the following, the present invention will be illustrated by means of examples, however, these examples are not to be considered as limiting the scope of the invention.

EXAMPLE 1

Two rolls of LDPE (low-density polyethylene) film was produced from a granulate, in which Roll A contained plastic material type Borealis® LE 0601 LDPE and Roll B plastic material type Borealis® LE 0601 LDPE+100 ppm ε-caprolactame.

The said two films were laminated to other films as mentioned below by means of various types of polyurethane adhesives. The adhesion between the films attached to each other was measured according to DIN 53357 at various times after the laminate preparation. The migration of primary aromatic amines (e.g. 2.4 toluyldiamine, 4,4'-diaminediphenylmethane) was determined on the basis of a standardized method, in which the possible present amine is coupled to N-(1-naphthyl)-ethylenediamine-dihydrochloride in order to form a coloured addition product. The absorption was measured at a wavelength of 550 nm, and the concentration established in comparison with a standard graph obtained at otherwise identical conditions. The concentration is listed in units of μg/dm$^2$.

Test I:

A solvent-free polyurethane adhesive of the type Pentacol® sk 402/C79, in a 100:50 mixture, was applied to a polyester with a thickness of 12 μm in a quantity of 1.5 g/m$^2$ film, and subsequently laminated to the films of rolls A and B. The results are shown in table 1.

As shown in the table, already after 48 hours the amine migration of the laminate according to the invention is so low that the said laminate meets the present requirements of the health authorities for use in connection with food. Actually, it takes more than 336 hours before laminate produced in a traditional manner may be used in connection with food.

Test II:

A solvent-free polyurethane adhesive of the type Pentacol® sk 402/C79, in a 100:50 mixture, was applied to an oriented polypropylene film from MOBIL (OPP MB200) in a quantity of 1.5 g/m film, and subsequently laminated to the films of rolls A and B. The results are shown in table 2.

In this test, the laminate according to the invention may be used in connection with food already after 48 hours, whereas the amine migration of traditionally produced laminate is so high, that after 504 hours it is still not ready for use.

Test III:

A solvent-based adhesive of the type Adcote® 718 A/c, in a 100:2 mixture, was applied to a polyester film with a thickness of 12 μm in a quantity of 2.0 g/m$^2$ film, and subsequently laminated to the films of rolls A and B. The results of the test are shown in table 3.

In the laminate according to the invention already after 48 hours, the amine migration is so low, that it meets with the requirements of the health authorities for use in connection with food. For the laminate prepared in the traditional manner 504 hours pass before it may be used in connection with food.

TABLE 1

| Laminate No. | | Time after Lamination Hours | | | | | |
|---|---|---|---|---|---|---|---|
| | | 2 | 4 | 24 | 48 | 168 | 336 | 504 |
| Adhesion (N per 15 mm) | | | | | | | | |
| Roll A + polyester | IA | 0.05 | 0.12 | 1.3 | 2.4 | dest | dest | dest |
| Roll B + polyester | IB | 0.23 | 1.8 | dest | dest | dest | dest | dest |
| Amine Migration (μm/dm$^2$) | | | | | | | | |
| Roll A + polyester | IA | n.d. | n.d. | 44 | 23 | 1.6 | 1.1 | 0.9 |
| Roll B + polyester | IB | n.d. | n.d. | 1.9 | 0.9 | 0.8 | — | — |

NOTE:
dest: Destructive adhesion
n.d.: Not determined

TABLE 2

| Laminate No. | | Time after Lamination Hours | | | | | |
|---|---|---|---|---|---|---|---|
| | | 2 | 4 | 24 | 48 | 168 | 336 | 504 |
| Adhesion (N per 15 mm) | | | | | | | | |
| Roll A + OPP | IIA | 0.02 | 0.06 | 2.2 | 2.4 | dest | dest | dest |
| Roll B + OPP | IIB | 0.25 | 1.5 | dest | dest | dest | dest | dest |
| Amine Migration (μm/dm$^2$) | | | | | | | | |
| Roll A + OPP | IIA | n.d. | n.d. | 99 | 71 | 25 | 11 | 1.5 |
| Roll B + OPP | IIB | n.d. | n.d. | 4.2 | 1.9 | 0.8 | — | — |

NOTE:
dest: Destructive adhesion
n.d.: Not determined

TABLE 3

| Laminate No. | | Time after Lamination Hours | | | | | |
|---|---|---|---|---|---|---|---|
| | | 2 | 4 | 24 | 48 | 168 | 336 | 504 |
| Adhesion (N per 15 mm) | | | | | | | | |
| Roll A + polyester | IIIA | 2.0 | 2.7 | 6.0 | 5.0 | 5.2 | 5.0 | — |
| Roll B + polyester | IIIB | 1.1 | 3.0 | 7.1 | 6.2 | 6.5 | 6.5 | — |
| Amine Migration (μm/dm$^2$) | | | | | | | | |
| Roll A + polyester | IIIA | n.d. | n.d. | 45 | 25 | 1.9 | 1.2 | 0 |

TABLE 3-continued

| Lam-<br>inate<br>No. | Time after Lamination Hours | | | | | | |
|---|---|---|---|---|---|---|---|
| | 2 | 4 | 24 | 48 | 168 | 336 | 504 |
| Roll B + polyester | IIIB | n.d. | n.d. | 2.5 | 0 | 0 | 0 | 0 |

NOTE:
n.d.: Not determined

EXAMPLE 2

The purpose of this example is to evaluate the properties of the laminate according to the invention as well as the laminate according to the prior art after complete curing of the adhesives used.

A number of laminates were prepared on the basis of various films and adhesives, cf. table 4. The laminates were evaluated in terms of adhesion between the films and the friction of the laminate when rubbed against itself.

The adhesion was determined by means of a variation of the method used in example 1, i.e. a strong adhesive tape was attached to each side of a laminate in a width of 15 mm, and subsequently it was determined what force, indicated in Newton, was necessary to separate the films from each other by means of loading the tape.

The friction was measured using the method according to DIN 53,375.

From table 4 it is deductable that the laminate according to the invention has a comparable or larger adhesion strength than those of prior art.

Furthermore, from table 4 one can deduce that the friction of all tested laminates is higher for laminates according to the invention. The higher friction is appropriate when the laminate is foreseen for automatic packaging machines, in which the laminate is conveyed by driving rollers. If the laminate is too smooth, the driving rollers may be sliding on the laminate so that the laminate, when used as packaging film, slips away from the adjustment of the packaging machine or photos that might be printed on the laminate.

What is claimed is:

1. A process for preparing a laminate comprising a cured adhesive layer, which comprises applying a fluid adhesive layer to a first solid film and contacting said fluid adhesive layer with a secondary solid or fluid film comprising a plastic material and a catalyst for accelerating the curing of said adhesive layer admixed in said plastic material.

2. A process according to claim 1, wherein the adhesive comprises a polyurethane adhesive.

3. A process according to claim 1, wherein the catalyst is selected from the group consisting of ε-caprolactame, polyethyleneglucol and dibutyltindilaurate, said catalyst being present in amounts up to 5,000 ppm in the plastic material.

4. A process according to claim 1, wherein the plastic material of the secondary film comprises a polyolefin.

5. A process according to claim 1, wherein the first film comprises paper; metal; an aluminum-containing metal; or a plastic material.

TABLE 4

| Laminate No. | First Film | Secondary Film | Adhesives | Adhesion after 30 days (N per 15 mm) | Friction after 30 days C.O.F. |
|---|---|---|---|---|---|
| IVA | Polyethylene Film Thickness: 50 μm | Polyamide Film Thickness: 50 μm | Pentacol ® sk 403A + c79 100:90 | 7.0 r | 0.19 |
| IVB | Polyethylene Film + 500 ppm ε-caprolactam Thickness: 50 μm | | | 8.0 r | 0.24 |
| VA | Polyester Film with vaporized metal | Polyethylene Film Thickness: 50 μm | Pentacol ® sk 403A + c79 | 1.6 lm | 0.19 |
| VB | Thickness: 12 μm | Polyethylene Film + 500 ppm ε-caprolactam Thickness: 50 μm | 100:50 | 2.0 lm | 0.24 |
| VIA | Laminate of polyester (thickness 12 μm) & aluminium film (9 μm thick) | Polyethylene Film Thickness: 50 μm | Pentacol ® sk 403A + c79 100:65 | 5.4 kpe | 0.17 |
| VIB | | Polyethylene Film + 500 ppm ε-caprolactam Thickness: 50 μm | | 6.0 kpe | 0.23 |
| VIIA | MB 400 (oriented polypropylene) | Polyethylene Film Thickness: 50 μm | Pentacol ® sk 403A + c79 100:65 | 3.4 fo | 0.17 |
| VIIB | | Polyethylene Film + 500 ppm ε-caprolactam Thickness: 50 μm | | 3.4 fo | 0.21 |
| VIIIA | Polyester film with vaporized metal | Polyethylene Film Thickness: 50 μm | Pentacol ® sk 406A + c78 | 2.2 lm | 0.17 |
| VIIIB | Thickness: 12 μm | Polyethylene Film + 500 ppm ε-caprolactam Thickness: 50 μm | 100:30 | 2.5 lm | 0.20 |

NOTE:
r: laminate torn apart
lm: minor metal transfer, kpe: adhesive on polyethylene, fo: film splitting 6. A process according to claim 1, wherein the first film and/or the secondary film is a laminate film comprising two or more film layers.

7. A process according to claim 1, wherein the first and the secondary film are contacted with each other by pressure applied by pressure or cooling rollers.

8. A laminate obtainable by the process according to claim 1.

9. A method for the packaging of food, which comprises contacting food with a laminate of claim 1.

10. A packaging material comprising a laminate of claim 1.

11. A process according to claim 2, wherein the catalyst is selected from the group consisting of $\epsilon$-caprolactame, polyethylene-glucol and dibutyltindilaurate, said catalyst being present in amounts up to 5,000 ppm in the plastic material.

12. A process according to claim 2, wherein the plastic material of the secondary film comprises a polyolefin.

13. A process according to claim 3, wherein the plastic material of the secondary film comprises a polyolefin.

14. A process according to claim 2, wherein the first film comprises paper; metal; an aluminum-containing metal; or a plastic material.

15. A process according to claim 3, wherein the first film comprises paper; metal; an aluminium-containing metal; or a plastic material.

16. A process according to claim 4, wherein the first film comprises paper; metal; an aluminium-containing metal; or a plastic material.

17. A process according to claim 2, wherein either the first film and/or the secondary film is a laminate film consisting of two or more film layers.

18. A process according to claim 3, wherein either the first film and/or the secondary film is a laminate film consisting of two or more film layers.

19. A process according to claim 4, wherein either the first film and/or the secondary film is a laminate film consisting of two or more film layers.

20. A process according to claim 5, wherein either the first film and/or the secondary film is a laminate film consisting of two or more film layers.

21. A process according to claim 6, wherein the first and secondary film are contacted with each other by pressure applied by pressure or cooling rollers.

22. A laminate obtainable by the process according to claim 6.

23. A process according to claim 1, wherein the catalyst comprises $\epsilon$-caprolactame.

24. A process according to claim 1, wherein the catalyst is present in amounts of 50–250 ppm in the plastic material.

25. A process according to claim 1, wherein the plastic material of the secondary film is selected from the group consisting of polyethylene and polypropylene.

26. A process according to claim 1, wherein the first film comprises a plastic material selected from the group consisting of polyesters, polyethers, polyamides and polyolefins, which plastic material may be vacuum evaporated and/or contain a catalyst.

27. A process according to claim 2, wherein the catalyst comprises $\epsilon$-caprolactame.

28. A process according to claim 2, wherein the catalyst is present in amounts of 50–250 ppm in the plastic material.

29. A process according to claim 2, wherein the plastic material of the secondary film is selected from the group consisting of polyethylene and polypropylene.

30. A process according to claim 2, wherein the first film comprises a plastic material selected from the group consisting of polyesters, polyethers, polyamides and polyolefins, which plastic material may be vacuum evaporated and/or contain a catalyst.

31. A process according to claim 3, wherein the plastic material of the secondary film is selected from the group consisting of polyethylene and polypropylene.

32. A process according to claim 3, wherein the first film comprises a plastic material selected from the group consisting of polyesters, polyethers, polyamides and polyolefins, which plastic material may be vacuumed, evaporated and/or contain a catalyst.

33. A process according to claim 4, wherein the first film comprises a plastic material selected from the group consisting of polyesters, polyethers, polyamides and polyolefins, which plastic material may be vacuum evaporated and/or contain a catalyst.

* * * * *